US009176739B2

(12) United States Patent
Steiss

(10) Patent No.: US 9,176,739 B2
(45) Date of Patent: Nov. 3, 2015

(54) SYSTEM AND METHOD FOR CHECKING RUN-TIME CONSISTENCY FOR SEQUENTIALLY AND NON-SEQUENTIALLY FETCHED INSTRUCTIONS

(75) Inventor: Donald E. Steiss, Richardson, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 615 days.

(21) Appl. No.: 13/204,346

(22) Filed: Aug. 5, 2011

(65) Prior Publication Data

US 2013/0036294 A1 Feb. 7, 2013

(51) Int. Cl.
| G06F 21/54 | (2013.01) |
| G06F 21/12 | (2013.01) |
| G06F 11/10 | (2006.01) |
| G06F 9/32 | (2006.01) |
| G06F 21/52 | (2013.01) |
| G06F 9/30 | (2006.01) |
| G06F 9/38 | (2006.01) |

(52) U.S. Cl.
CPC ............ *G06F 9/322* (2013.01); *G06F 9/30185* (2013.01); *G06F 9/3861* (2013.01); *G06F 11/10* (2013.01); *G06F 21/125* (2013.01); *G06F 21/52* (2013.01)

(58) Field of Classification Search
CPC ............................... G06F 21/125; G06F 21/52
USPC .............................. 712/233; 726/22; 714/800
See application file for complete search history.

(56) References Cited

U.S. PATENT DOCUMENTS

| 5,450,565 | A | * | 9/1995 | Nadir et al. ................... 711/128 |
| 5,897,664 | A | | 4/1999 | Nesheim et al. |
| 5,963,983 | A | | 10/1999 | Sakakura et al. |
| 6,138,235 | A | | 10/2000 | Lipkin et al. |
| 6,543,028 | B1 | * | 4/2003 | Jamil et al. ..................... 714/800 |
| 6,629,315 | B1 | | 9/2003 | Naylor |
| 6,665,575 | B2 | | 12/2003 | Betawar et al. |
| 6,697,690 | B2 | | 2/2004 | Scholl et al. |
| 6,907,308 | B1 | | 6/2005 | Bartlett et al. |
| 7,543,221 | B2 | * | 6/2009 | Mukherjee et al. ........... 714/800 |
| 7,673,190 | B1 | * | 3/2010 | Engelbrecht et al. ........... 714/49 |
| 7,840,800 | B2 | | 11/2010 | Boudou et al. |
| 7,904,817 | B2 | | 3/2011 | Bergantino et al. |
| 7,975,109 | B2 | | 7/2011 | McWilliams et al. |
| 9,058,483 | B2 | * | 6/2015 | Chen et al. ............................ 1/1 |
| 9,064,099 | B2 | * | 6/2015 | Horning et al. ........................ 1/1 |
| 2002/0061108 | A1 | | 5/2002 | Shinohara |
| 2002/0194389 | A1 | | 12/2002 | Worley et al. |
| 2004/0015269 | A1 | | 1/2004 | Jungmann et al. |

(Continued)

*Primary Examiner* — Andrew Caldwell
*Assistant Examiner* — Yuqing Xiao
(74) *Attorney, Agent, or Firm* — Patent Capital Group

(57) ABSTRACT

A system and method includes modules for determining whether an instruction is a target of a non-sequential fetch operation with an expected numerical property value, and avoiding execution of the instruction if it is the target of the non-sequential fetch operation and does not have the expected numerical property. Other embodiments include encoding an instruction with a functionality that is a target of a non-sequential fetch operation with an expected numerical property value. Instructions with the same functionality that are not targets of non-sequential fetch operations can be encoded with a different numerical property value. More specific embodiments can include a numerical property of parity, determining whether the instruction is valid, and throwing an exception, setting status bits, sending an interrupt to a control processor, and a combination thereof to avoid execution.

18 Claims, 4 Drawing Sheets

(56) References Cited

U.S. PATENT DOCUMENTS

| | | |
|---|---|---|
| 2004/0039916 A1 | 2/2004 | Aldis et al. |
| 2004/0078107 A1 | 4/2004 | Chou et al. |
| 2004/0078182 A1 | 4/2004 | Nixon et al. |
| 2005/0005074 A1 | 1/2005 | Landin et al. |
| 2005/0034048 A1 | 2/2005 | Nemawarkar et al. |
| 2005/0038565 A1 | 2/2005 | Power et al. |
| 2005/0114578 A1 | 5/2005 | Lewis |
| 2005/0228846 A1* | 10/2005 | Murray ........................ 708/671 |
| 2006/0174063 A1 | 8/2006 | Soules et al. |
| 2006/0253702 A1 | 11/2006 | Lowell et al. |
| 2008/0250229 A1* | 10/2008 | Stempel et al. ............... 712/210 |
| 2008/0307031 A1* | 12/2008 | Tam .............................. 708/603 |
| 2013/0024676 A1* | 1/2013 | Glew et al. .................... 712/244 |
| 2013/0036464 A1* | 2/2013 | Glew et al. ...................... 726/22 |

* cited by examiner

US 9,176,739 B2

SYSTEM AND METHOD FOR CHECKING RUN-TIME CONSISTENCY FOR SEQUENTIALLY AND NON-SEQUENTIALLY FETCHED INSTRUCTIONS

TECHNICAL FIELD

This disclosure relates in general to the field of computer systems and, more particularly, to instruction sets with run-time consistency check.

BACKGROUND

Many electronic devices use processors (e.g., a central processing unit (CPU)) and a memory to perform various functions. For example, embedded processors in certain routers may be responsible for data-plane processing tasks and for network traffic flows (propagating through the routers). The processors may facilitate baseline packet routing operations, including Layer 2 and Layer 3 forwarding, quality-of-service (QoS) classification, policing and shaping, security access control lists (ACLs), and loadbalancing. Due to high consumer demand, there is a push to pack more functionalities into electronic devices, while concurrently, device sizes are either remaining constant or becoming smaller.

As more functionalities are packed into smaller footprints, there is a demand for more efficient and reliable processors that can facilitate the myriad functionalities of the electronic device. For example, certain processors can consolidate a multitude of customized packet-processor cores (e.g., running at 900 MHz to 1.2 GHz) into a single piece of silicon, and thereby, reducing the use of external service blades inside the router. Such high performance processors may benefit from efficient and robust instruction set architectures for reliable system operations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes determining whether an instruction is a target of a non-sequential fetch operation with an expected numerical property value. The method can also include avoiding execution of the instruction if it is the target of the non-sequential fetch operation (and does not have the expected numerical property value). Other embodiments may include encoding an instruction having a functionality that is a target of a non-sequential fetch operation with an expected numerical property value. Instructions with the same functionality that are not targets of non-sequential fetch operations are encoded with a different numerical property value. More specific embodiments may include a numerical property of parity, determining whether the instruction is valid, setting status bits, sending an interrupt to a control processor, and any combination thereof to avoid execution (and potentially other features).

An example apparatus may include a bitwise exclusive OR (XOR) network (that may include any suitable electronic components and electronic circuitry), an indicator of a non-sequential fetch operation (where the indicator may include any suitable electronic circuitry and electronic components), and an error detection logic (where logic may include any suitable code, software, etc.). The apparatus can be configured to determine whether an instruction is a target of a non-sequential fetch operation that has an expected numerical property value (and avoid execution of the instruction if the instruction does not have the expected numerical property and the instruction is the target of the non-sequential fetch operation). The apparatus may further include an instruction memory system configured to store encoded instructions of an instruction set, a program counter configured to store an address of a next instruction to fetch, an instruction fetch logic configured to fetch an instruction from the instruction memory system corresponding to the address in the program counter, an instruction decode logic configured to decode the instruction, an instruction issue logic configured to choose execution of the instruction, a read logic configured to read one or more operands based on the instruction, and an integer instruction logic configured to provide control signals that direct the program counter to a non-sequential next address (and potentially set the indicator when a change in program flow is encountered and other features).

Example Embodiments

Figure 1:
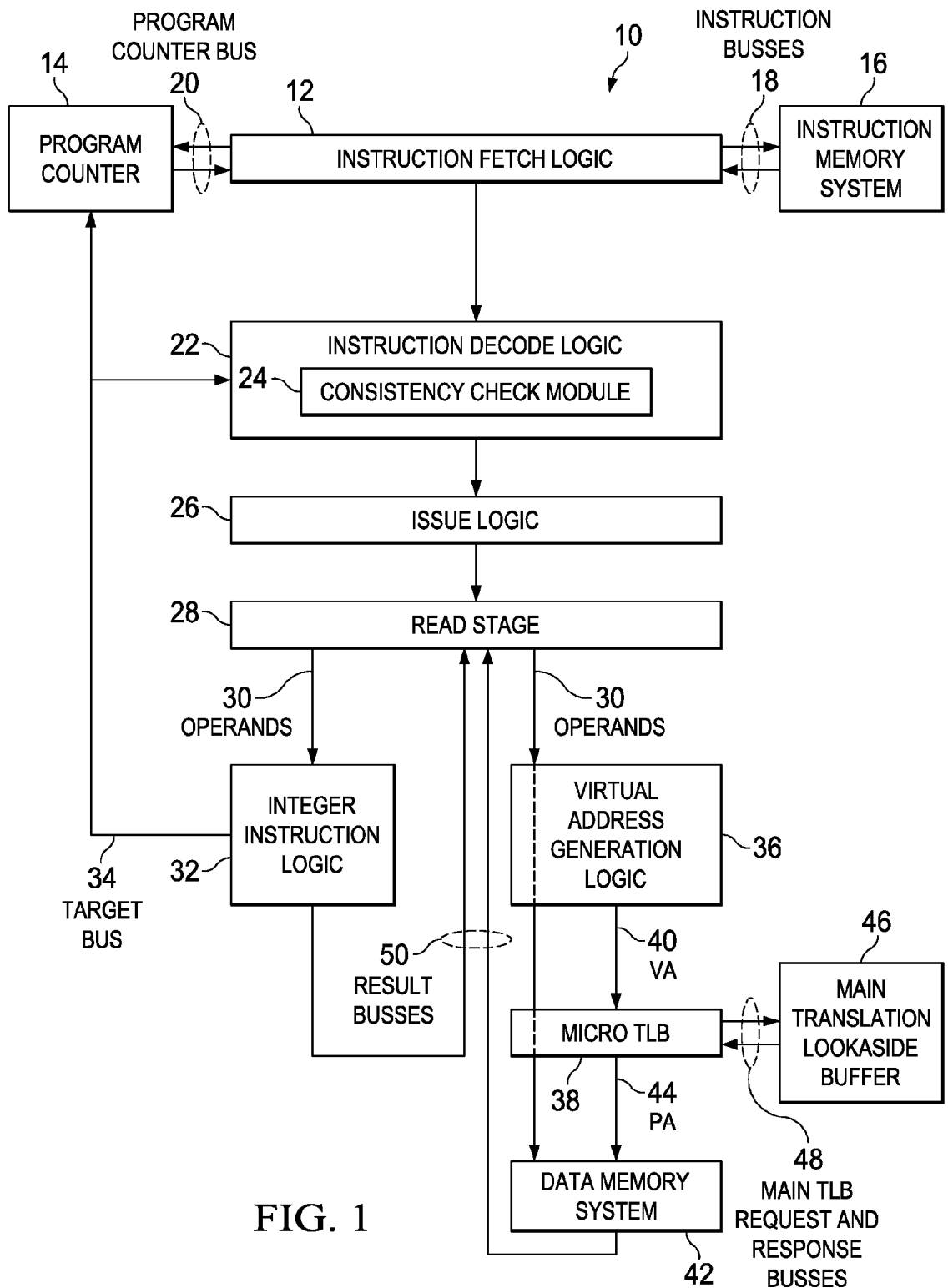
FIG. 1 is a simplified block diagram of one embodiment of a system in accordance with the present disclosure.

Turning to FIG. 1, FIG. 1 is a simplified block diagram of an example system 10 for implementing instruction sets with run time consistency check in accordance with one embodiment of the present disclosure. As used herein, an "instruction set" can be part of computer architecture related to programming, including without limitation, native data types, instructions, registers, addressing modes, memory architecture, interrupt and exception handling, and external input/output. An instruction set may include specifications for operation codes in machine language, and native language commands that may be implemented by a particular system, such as a processor. System 10 may encompass an embedded microprocessor in a network processor (e.g., in a router), a microprocessor in mobile devices, a digital signal processor, a computer processor, or other forms of programmable devices such as industrial controllers, array processors, and the like, which are capable of fetching and executing instructions, as described herein. System 10 may execute processes to retrieve an instruction from its memory, determine which actions the instruction commands, and execute those actions.

System 10 may include an instruction fetch logic 12, a program counter 14, and an instruction memory system 16 coupled to a program counter bus 20 and instruction busses 18. An instruction decode logic 22 can include a consistency check module 24 for implementing instruction sets with run time consistency check. An issue logic 26, a read stage 28, and various other components may also be included in system 10 to execute encoded instructions stored in instruction memory system 16.

Consistency check module 24 may detect certain errors corresponding to certain classes of hardware and software problems that, if left undetected, could lead to data corruption, router-wide crashes, or other significant problems. Without limitation, examples of types of errors detected by consistency check module 24 include: software errors in computed jumps, which result in the execution of unexpected instructions; software errors in linking or overlays, which result in the execution of incorrect instructions; software errors in memory management unit configuration that result in incorrect mappings of program pages to virtual addresses; software errors that cause in-stack corruption such that an attempt to return to a calling procedure may result in the execution of incorrect instructions; software errors in just-in-time (JIT) compiler systems, which cause incorrect instructions to be generated; hardware errors in instruction cache controls, which result in incorrect mapping of program addresses to instruction cache lines; hardware errors that result in multiple bit errors in memory structures or communication mechanisms, which are undetected by parity checks, etc. In an example embodiment, consistency check module 24 may detect unexpected code execution due to hardware, software or linking problems within executable code pages. Consistency check module 24 may perform run-time consistency checking of instructions to determine errors.

System 10 may be configured with a software development environment that has software elements to compile a high-level language to assembly code, convert assembly code into binary encoded instructions, determine which instructions are likely to be targets of non-sequential fetch operations, use a particular encoding with a specific numerical property for instructions that are likely to be targets of non-sequential fetch operations, and use another encoding without the specific numerical property for instructions, which are not likely to be a target of a non-sequential fetch operation. The configuration shown in FIG. 1 is for ease of description only, and should not be interpreted to limit the broad scope of the present disclosure. Numerous configurations of the components and communication lines in system 10 are possible, and any such permutations are encompassed herein in the present disclosure.

For purposes of illustrating certain example techniques of system 10, it is important to understand the activities associated with a typical environment in which system 10 would operate. The following foundational information may be viewed as a basis from which the present disclosure may be properly explained. Such information is offered earnestly for purposes of explanation only and, accordingly, should not be construed in any way to limit the broad scope of the present disclosure and its potential applications.

Processors, such as microprocessors, may include a variety of logic circuits fabricated on one or more semiconductor chips. Such logic circuits typically include a central processing unit ("CPU") core, memory, and various other components. The logic circuits generally implement numerous instruction sets comprising instructions. An instruction can encompass an operation of a processor, including data handling and memory operations (e.g., set a register to a fixed constant value, move data from a memory location to a register, read and write data from hardware devices, etc.), arithmetic and logic operations (e.g., add, subtract, multiply, or divide values of two registers, place the result in a register, set one or more condition codes in a status register, perform bitwise operations, compare two values in registers, etc.), and control flow operations (e.g., branch to another location in the program and execute instructions there, conditionally branch to another location if a certain condition holds, etc.). An instruction may specify which operations to perform (e.g., add, load, branch, etc.), where to find the operands (e.g., CPU registers, memory cells, input/output locations, etc.), locations to store results (e.g., CPU register, memory cells, etc.), memory locations or offsets, addressing modes (e.g., for interpreting operands), and other specifications.

An instruction generally comprises a series of bits of ones and/or zeroes. The size or length of an instruction can vary (e.g., from as little as 4 bits in some microcontrollers, to 120 bits in particular systems). For example, processors used in routers, personal computers, mainframes, and supercomputers may have instruction sizes between 8 and 64 bits. Within a given instruction set, different instructions may have different lengths. In some architectures, instructions may be a fixed length, typically corresponding with that architecture's word size. In other architectures, instructions may have variable length, typically integral multiples of a byte. An instruction may have various numerical properties associated with it. For example, parity is a numerical property of an instruction that specifies whether the number of ones (1's) in the instruction is an odd or an even number.

Instructions may have different formats or encodings (binary representation of instructions that a processor executes), for example, I-type instruction (e.g., includes instructions with an immediate operand, branch instructions, and load and store instructions), R-type instruction (e.g., includes arithmetic and logic with operands in registers, shift instructions, and register direct jump instructions), and J-type instruction (e.g., instructions with far jump instructions). I-type instructions and variations may be used for memory operations, R-type instructions and variations may be used for arithmetic and logic operations and J-type instructions, and variations may be used for far jump operations.

Instructions may be executed sequentially or non-sequentially. The processor, after executing a sequential instruction, subsequently executes the following instruction. In contrast, non-sequential instruction execution generally causes the processor to execute an instruction, which is not an immediately following instruction. Examples of non-sequential instructions include conditional branching instructions (e.g., "Jump if Bit Set" instruction), direct branching instructions (e.g., "Direct Jump and Call" instruction), returns from routines instructions (e.g., returning to the address following the instruction that called the subroutine), interrupt instructions, etc.

Errors may occur in instruction executions for various reasons. In particular, errors may be more likely for non-sequential instructions: causing the microprocessor to incorrectly execute the instructions. The error may occur in a branch instruction (e.g., mistaken branch, or branch to a random address, an error in the branch flag or in a target address, etc.) and by instructions executed earlier than the branch instruction, such as instructions that generate flags, which affect the branch instruction.

Conventional control flow checking may be used to detect one or more of the branch errors by comparing a runtime signature of a basic block with a pre-computed signature assigned to the basic block. Additional instructions may also be used for such methods. Alternatively, error correction codes (ECC) may be used to detect errors, where dedicated error codes can be added to instructions to detect errors. Memory management units are also used to segregate code to be executed, from code that is not to be executed. X-space is an example of how a memory management unit can be used for this purpose. Illegal instruction detection is another way that unexpectedly executed code can be detected.

However, such schemes have disadvantages such as using additional instructions or dedicated bits (e.g., parity bits) in an instruction. Typically, because the length of an instruction is predetermined and may not be changed easily for a particular instruction set, the amount of information that may be stored in the instruction may be reduced if one or more bits are used for dedicated error detection. Therefore, there is a need for error detection methods that do not reduce the amount of information stored in the instruction, while detecting hardware and software errors robustly.

An architecture for instruction sets with run-time consistency check, as outlined by FIG. 1, can resolve many of these issues (and others). Embodiments according to the present disclosure may provide multiple encodings for each instruction such that more than one parity is possible for each instruction. Multiple instruction encodings may allow for arbitrary instructions to be control transfer targets (e.g., targets of non-sequential fetch operations). According to example embodiments, system 10 may be configured for a specific parity for instructions expected to be control transfer targets, and a different parity for non-control transfer target instructions. In cases where instruction encodings may provide for fields with arbitrary values, it may be convenient to provide multiple parity versions. In an example embodiment, system 10 may provide for valid control transfer targets (e.g., an address of location to jump to) having a specific parity. Assemblers (or other code generators) may use the specific parity for targets and another parity for the remaining instructions. A control transfer to an instruction without the proper parity may result in an exception and, further, indicate that an unexpected branch target was encountered. For example, this could be the result of an incorrectly coded computed branch, a hardware failure, or a problem during assembly and linking, etc.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the infrastructure of FIG. 1, the binary instruction encodings (as defined by the instruction set) are stored in memory, for example, instruction memory system 16 of FIG. 1. Instruction fetch logic 12 can communicate with program counter 14 over program counter bus 20. Program counter 14 stores addresses corresponding to a next instruction to be executed. Program counter bus 20 may convey an instruction address to instruction fetch logic 12. Program counter bus 20 can also update from instruction fetch logic 12 to program counter 14. For example, for sequential instructions, instruction fetch logic 12 may increment the program counter by a constant, and may send the estimated address to program counter 14 over program counter bus 20.

Instruction fetch logic 12 can communicate with instruction memory system 16 over instruction busses 18. Instruction busses 18 can convey instruction addresses from instruction fetch logic 12 to instruction memory system 16. For example, instruction fetch logic 12 can fetch an instruction from instruction memory system 16 corresponding to an address stored in program counter 14 over instruction busses 18. Instruction busses 18 can convey instructions from instruction memory system 16 back to instruction fetch logic 12. Instruction memory system 16 may act on addresses from instruction busses 18 to look up data (e.g., using static random access memory (SRAM) or caches) representing the corresponding instruction. The instruction provided by instruction memory system 16 may comprise several bytes (e.g., 64 bytes, 128 bytes, etc). Instruction memory system 16 may store encoded instructions of an instruction set, where the instructions are encoded such that an instruction having a particular functionality (e.g., arithmetic and logic operation) that is a target of a non-sequential fetch operation is encoded with an expected numerical property value (e.g., even parity of 1), and another instruction having the same functionality that is not a target of a non-sequential fetch operation is encoded with a different expected numerical property value (e.g., even parity of 0).

Instruction fetch logic 12 can extract a particular sequence of bytes (e.g., 4 bytes) that corresponds to one instruction. Instruction fetch logic 12 may sequence instruction fetches from instruction memory system 16, detect exceptions related to instruction fetching, and identify instruction boundaries. Instruction fetch logic 12 may send the extracted instruction to instruction decode logic 22 to map the raw instruction bytes to control signals for the operating system.

Instruction decode logic 22 can interpret the instruction. Instruction decode logic 22 may comprise consistency check module 24 in certain example implementations. In operation, consistency check module 24 can detect errors in non-sequential instructions. If an instruction is determined to have an error, consistency module 24 may facilitate suitable alerts or other actions as appropriate and based on particular needs. Consistency check module 24 may avoid execution of instructions that have errors, such as instructions that have an unexpected numerical property value.

Instruction decode logic 22 may send the control signals to issue logic 26. Issue logic 26 may examine the control signals from instruction decode logic 22 and look up past history to determine if the instruction represented by the control signals should be executed. Issue logic 26 may act as a gatekeeper and permit execution of the instruction based on a status of system 10. For example, issue logic 26 may look for pipeline hazards, such as data hazards, structural hazards and control hazards (or branching hazards) that may potentially result in incorrect execution.

If the instruction may be executed, issue logic 26 is configured to transmit the control signals to read stage 28. Read stage 28 may access registers and produce operands 30 for integer instruction logic 32. Integer instruction logic 32 can generate control signals for target bus 34 that may direct program counter 14 to a non-sequential next address when a jump, call, return or branch instruction causes a change in program flow. As used herein, the term "program flow" refers to the order in which instructions are executed or evaluated. Typically, a program flow is line-by-line (e.g., sequential instructions). Target bus 34 may also provide the information to instruction decode logic 22 to enable identifying a first instruction to be decoded from a non-sequential program address.

In example embodiments, each stage of an instruction fetch and execute (e.g., instruction fetch, instruction decode, instruction execute, memory access, etc.) may use one clock cycle as the instruction passes through the stages sequentially. In an example architecture without pipelining, an instruction fetch-and-execute cycle may take up to five clock cycles (e.g., corresponding to instruction fetch, instruction decode, execution, memory access, and write-back). At the end of the fetch cycle, the address of the next instruction to be executed in the next fetch cycle may be found in program counter 14.

If needed, operands 30 and/or results may be stored in memory, using various modules and appropriate communication busses, for example, virtual address generation logic 36, micro translation lookaside buffer (TLB) 38, bus VA 40, data memory system 42, bus PA 44, main TLB 46 and main TLB request and response busses 48. Results may be read back into read stage 28 from integer instruction logic 32 as appropriate. Result busses 50 may also send results back into read stage 28 from the various modules appropriately. In an example embodiment, read stage 28 may access registers and produce operands 30 for virtual address generation logic 36. Results from integer instruction logic 32 and data memory system 42 may update read stage 28 via result busses 50. Integer instruction logic 32 can use operands 30 and signals from instruction decode logic 22 to evaluate integer operations such as addition, subtraction, shifting and masking. Virtual address generation logic 36 may use operands 30 to compute a virtual address, for example using shifting and addition. The virtual address may be passed to Micro TLB 38 over bus VA 40. Micro TLB 38 may read VA 40, convert the virtual address to a physical address, and place it on PA 44. Data memory system 42 may act on the physical address from bus PA 44 and operands 30 to perform memory load and store operations. The results from load operations may be returned to read stage 28 over result busses 50.

Figure 2:
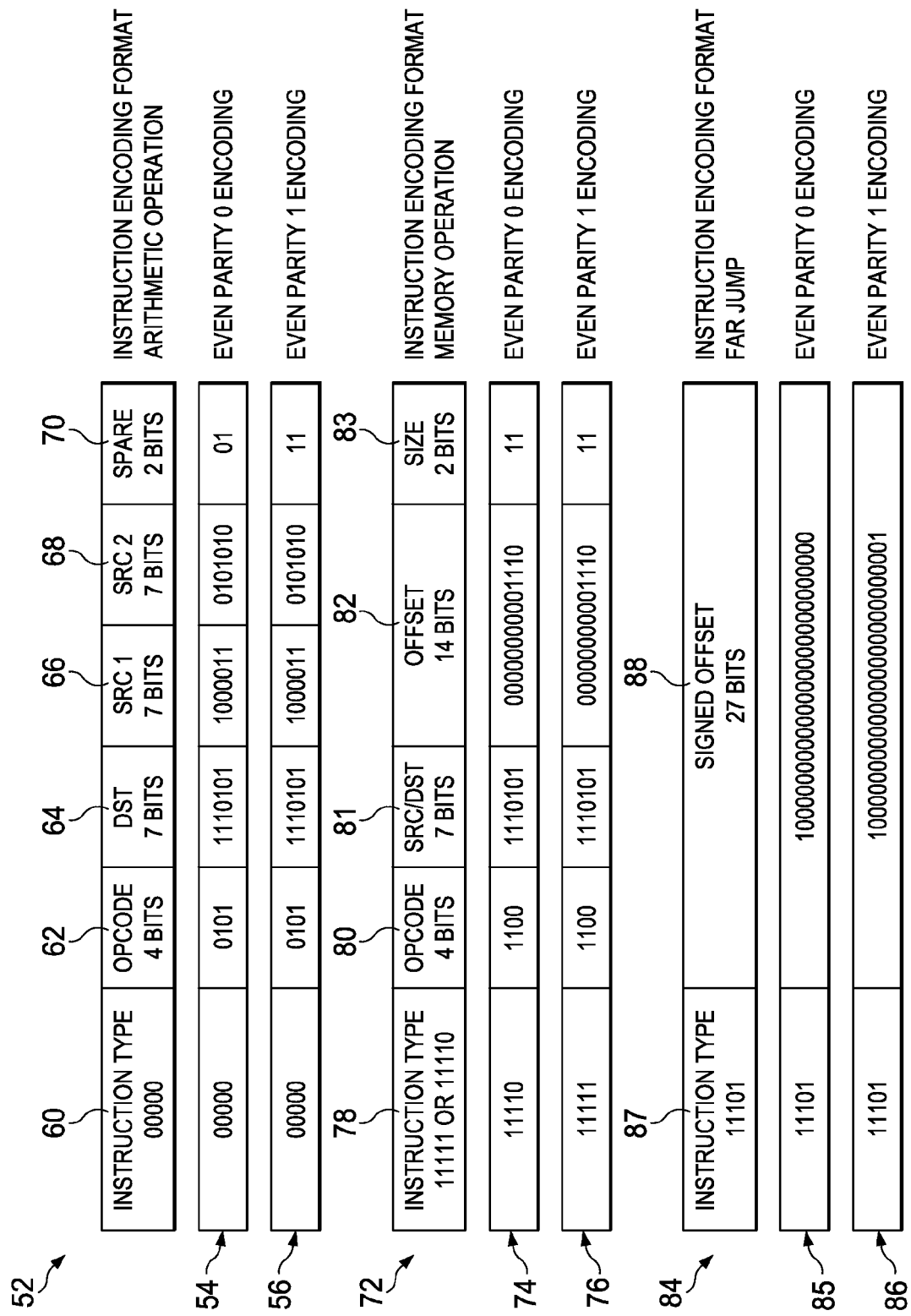
FIG. 2 is a simplified block diagram illustrating example instruction encodings in accordance with the present disclosure.

Turning to FIG. 2, FIG. 2 illustrates example encodings of instructions according to embodiments of the present disclosure. The example encodings illustrate a 32-bit instruction. Other instruction lengths may also be used without departing from the scope of the present disclosure. A state-space available for instruction encoding may be a limited and scarce resource in many instruction set architectures. Therefore, according to embodiments of the present disclosure, multiple encoding techniques may be employed to produce a desired numerical property value (e.g., parity, Hamming distance range, run length maximum of 1 or 0, etc.) depending on the instruction functionality (e.g., memory operation, arithmetic operation or far jump operation, etc.) to detect certain software and hardware errors.

In an example embodiment, an instruction having a particular functionality (e.g., addition or memory load operation) that is a target of a non-sequential fetch operation may be encoded with an expected numerical property value (e.g., even parity of 1) and another instruction having the same functionality that is not a target of a non-sequential fetch operation may be encoded with a different expected numerical property value (e.g., even parity of 0). A programmer may construct instructions with an expected numerical property value for the instruction (e.g., even parity 0), and consistency check module 24 may be configured to detect a deviation from the expected numerical property value to indicate an error in the instruction. By using a specific numerical property value on an instruction (e.g., a first instruction after a program flow change), numerous software or hardware errors can be detected at run-time. Detecting these errors can improve reliability of the combined hardware and software system because a likelihood of execution of unexpected instructions is reduced.

In an example embodiment, where parity is the numerical property of interest, an even parity bit generator generates an output of 0 if the number of 1's in the input sequence (e.g., instruction) is even and an output of 1 if the number of 1's in the input sequence is odd. The parity value computed over the instruction may be separate (and in some embodiments, additional) from any parity or error checking that may be present to detect errors in memory or communication between modules and/or components in system 10. Further, unlike a parity information that may exist in a memory structure or communication path, the computed and expected parity value may not be explicitly represented in the binary instruction, but may be implicit in how the instruction appears in a program order of instruction execution. For example, instructions that are targets of non-sequential fetch operations may have an expected parity (e.g., even parity of 1) as opposed to other instructions in the instruction set.

In an example embodiment, an instruction set may define a subset of instructions that can be encoded with an arbitrary parity value. One or more instructions in the instruction set may change a flow of instruction execution from sequential to a non-sequential address. Components of consistency check module 24 may compute parity of an instruction to be executed, recognize a first instruction to be executed at a non-sequential address, compare the computed parity of the instruction to an expected value, and determine whether the instruction has a parity value that matches the expected value.

In the non-limiting implementation of FIG. 2, instruction encoding format 52 is an example encoding definition for an arithmetic and logic operation (e.g., integer instruction). Instructions 54 and 56 may be encoded according to instruction format 52. Instruction format 52 may provide 5 bits for an instruction type field 60 (e.g. 00000 may indicate an integer instruction logic), 4 bits for opcode field 62 (e.g., indicating the operation to be performed, such as add, subtract, etc.), 7 bits each for destination field (DST) 64, and source operand fields (SRC1 and SRC2) 66 and 68, and 2 bits for spare bits field 70. An even parity generator may generate a 0 for instruction 54, because the number of 1's in instruction 54 corresponds to an even number. The even parity generator may generate a 1 for instruction 56, because the number of 1's in instruction 56 corresponds to an odd number.

Instructions 54 and 56 may have identical functionality, but different parities due to different values in spare bits field 70. If the instruction comprising the arithmetic and logic operation is a target of a non-sequential fetch operation, one of the spare bits may be set to 1, resulting in an even parity of 1 (e.g., instruction 56). On the other hand, if the instruction is not a target of a non-sequential fetch operation, the one of the spare bits may be set to 0, resulting in an even parity of 0 (e.g., instruction 54). Thus, in an example embodiment, when coding an arithmetic instruction in a program, a programmer may use instruction 56 as a target of a non-sequential fetch operation and instruction 54 otherwise.

Instruction encoding format 72 is an example encoded definition for another class of instructions (e.g. memory operation type instructions) where multiple values of a field may be defined to modulate the parity of an instruction. Instructions 74 and 76 may be encoded according to instruction format 72. Instruction encoding format 72 may provide 5 bits for an instruction type field 78, 4 bits for opcode field 80 (e.g., indicating the operation to be performed, such as load, etc.), 7 bits for a source or destination operand field (SRC/DST) 81, 14 bits for offset bits field 82, and 2 bits for size bits field 83. Parity of instructions 74 and 76 may be differentiated by instruction type field 78. For example, a value of 11110 in instruction type field 78 may cause an even parity generator to return 0, whereas a value of 11111 in instruction type field 78 may cause the even parity generator to return 1.

Instructions 74 and 76 may have identical functionality, but different parities due to different values in instruction type field 78. If the instruction comprising the memory operation is a target of a non-sequential fetch operation, one of the bits in instruction type field 78 may be set to 1, resulting in an even parity of 1 (e.g., instruction 76). On the other hand, if the instruction is not a target of a non-sequential fetch operation, the one of the bits in instruction type field 78 may be set to 0, resulting in an even parity of 0 (e.g., instruction 74). Thus, in an example embodiment, when coding a memory instruction in a program, a programmer may use instruction 76 as a target of a non-sequential fetch operation and instruction 74 otherwise.

Instruction encoding format 84 is an example encoded definition for yet another class of instructions (e.g., far jump type instructions). Instructions 85 and 86 may be encoded according to instruction format 84. Generally, these types of instructions are rarely used. Instruction encoding format 84 may provide for 5 bits for instruction type field 87 and 27 bits for signed offset bits field 88. An even parity generator may return a parity of 0 for instruction 85 and 1 for instruction 86. If the instruction comprising the far jump operation is a target of a non-sequential fetch operation, one of the bits in signed offset bits field 88 may be set to 1: resulting in an even parity of 1 (e.g., instruction 86). On the other hand, if the instruction is not a target of a non-sequential fetch operation, the one of the bits in signed offset bits field 88 may be set to 0: resulting in an even parity of 0 (e.g., instruction 84). However, these encodings may cause system 10 to perform different actions for the different parities. Thus, this encoding is not preferentially favored, but may be used depending on particular needs and considerations. Either these rare instructions can be avoided as targets of non-sequential fetches or other instructions elsewhere in the code can be adjusted to compensate for the difference in functionality.

The encoding formats, including the instruction length, number of fields, and number of bits for each field described herein are for example purposes only. Numerous other encoding formats with different instruction lengths, fields, and/or bits may be possible for an instruction. All such variations in encoding formats, including number of fields, length of fields, number of bits, instruction lengths, etc., are within the scope of this disclosure.

Figure 3:
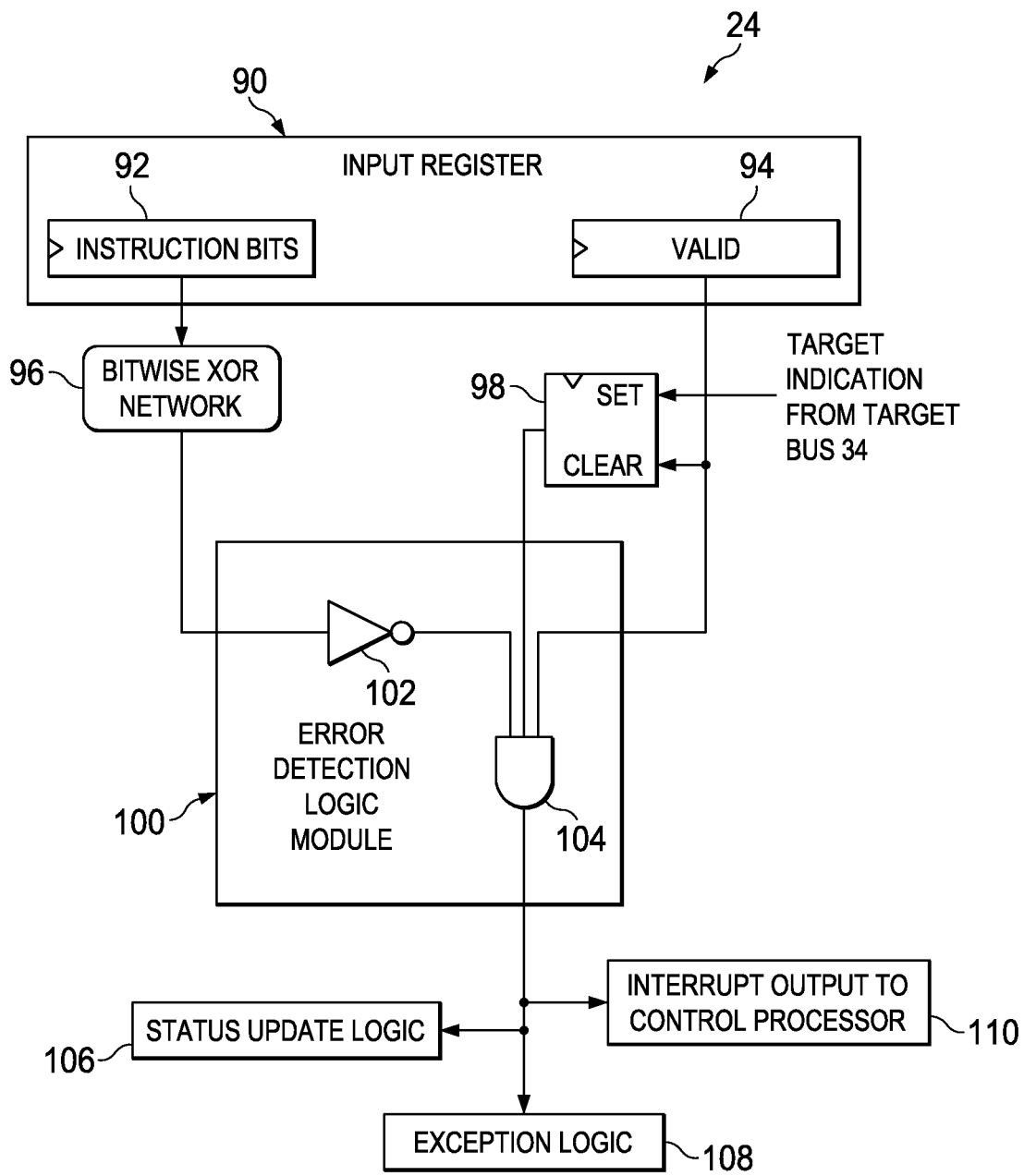
FIG. 3 is a simplified block diagram of additional details of the system for embodiments according to the present disclosure.

Turning to FIG. 3, FIG. 3 is a simplified block diagram illustrating an example embodiment of the present disclosure. Consistency check module 24 may comprise an input register 90, which holds a new instruction to be decoded in instruction bits 92, along with a signal in a "valid" 94 register indicating that the instruction is valid (e.g., ready to be decoded). In an example embodiment, valid (register) 94 returns a value of 1 for a valid instruction, and 0 for an invalid instruction (e.g., when system 10 is waiting for memory to be restored and instruction may not be decoded in the meantime). The instruction from instruction bits 92 is passed through a bitwise exclusive OR (XOR) network 96 (which can include any suitable components). Consistency check module 24 may compute a numerical property value (e.g., parity) of each instruction using bitwise XOR network 96. In an example embodiment using parity, bitwise XOR network 96 may return a value of 0 for even parity, and 1 for odd parity.

Branch target indication 98 may be a clocked set-reset storage element that responds to a program flow change. For example, target indication from target bus 34 may set branch target indication 98 to "set" for a first non-sequential instruction in a fetch cycle. Thus, the instruction that is being processed may be a target of a non-sequential flow when branch target indication 98 is set. After the instruction is processed (e.g., decoded), branch target indication 98 may be reset to "clear." In an example embodiment, when branch target indication 98 is set, an output from branch target indication 98 is 1, and when branch target indication 98 is cleared, the output is 0.

In an example embodiment, the instruction set may be configured such that when branch target indication 98 is "set," a numerical property value (e.g., even parity) of 1 is expected for the computed numerical property value from bitwise XOR network 96. In an example embodiment, a valid signal may cause branch target indication 98 to clear at the end of a clock cycle when any valid instruction is observed, including sequential instructions or branch targets (e.g., the set and clear are typically synchronous with the clock).

Error detection logic module 100 may invert the calculated numerical property value from bitwise XOR network 96 using inverter 102, then logically AND this value with outputs from valid register 94 and branch target indication 98 using AND gate 104. According to an example embodiment, when a non-sequential valid instruction is encountered, the output of branch target indication 98 and valid register 94 may both be 1. The output of bitwise XOR network 96 for an error free instruction may also be 1, which is inverted to 0 by inverter 102. Consequently, AND gate 104 returns a value of 0 for a valid, error-free non-sequential instruction.

On the other hand, if the instruction has an error, the output of bitwise XOR network 96 may be 0, which may be inverted to 1 by inverter 102. Consequently, AND gate 104 returns a value of 1, which may be configured to be an error signal that can be used for further actions that avoid execution of the instruction, for example, an action to set status bits (e.g., status update logic 106), an action to generate an exception (e.g., exception logic 108), action 110 to interrupt a control processor (e.g., interrupt output to a control processor), or a combination thereof. Action 106 may set one or more bits in a status register, with or without an exception, to notify software than an unexpected condition was detected.

Action 108 may generate an exception to avoid execution of the instruction and notify software that an unexpected condition was detected. Action 110 may generate a status output signal, with or without an exception, to send an interrupt indication to a control processor. The interrupt indication to the control processor may result in the control processor halting or resetting the programming computing device under the direction of supervisor software running on the control processor. Various other actions may also be possible, based on particular needs and considerations.

In alternate embodiments, an even parity value of 0 may be expected at the target of a non-sequential address. Instructions that are not targets of program flow changes may be encoded, wherever possible, with a parity opposed to the expected parity (e.g., even parity of 1). In other embodiments, some other non-parity numerical property (assuming flexibility for encoding the non-parity numerical property is provided in the instruction set definition) may also be expected (e.g., encoded appropriately) without changing the scope of the present disclosure. Instructions that are not targets of program flow changes may be encoded without the numerical property value expected for a non-sequential address target.

Figure 4:
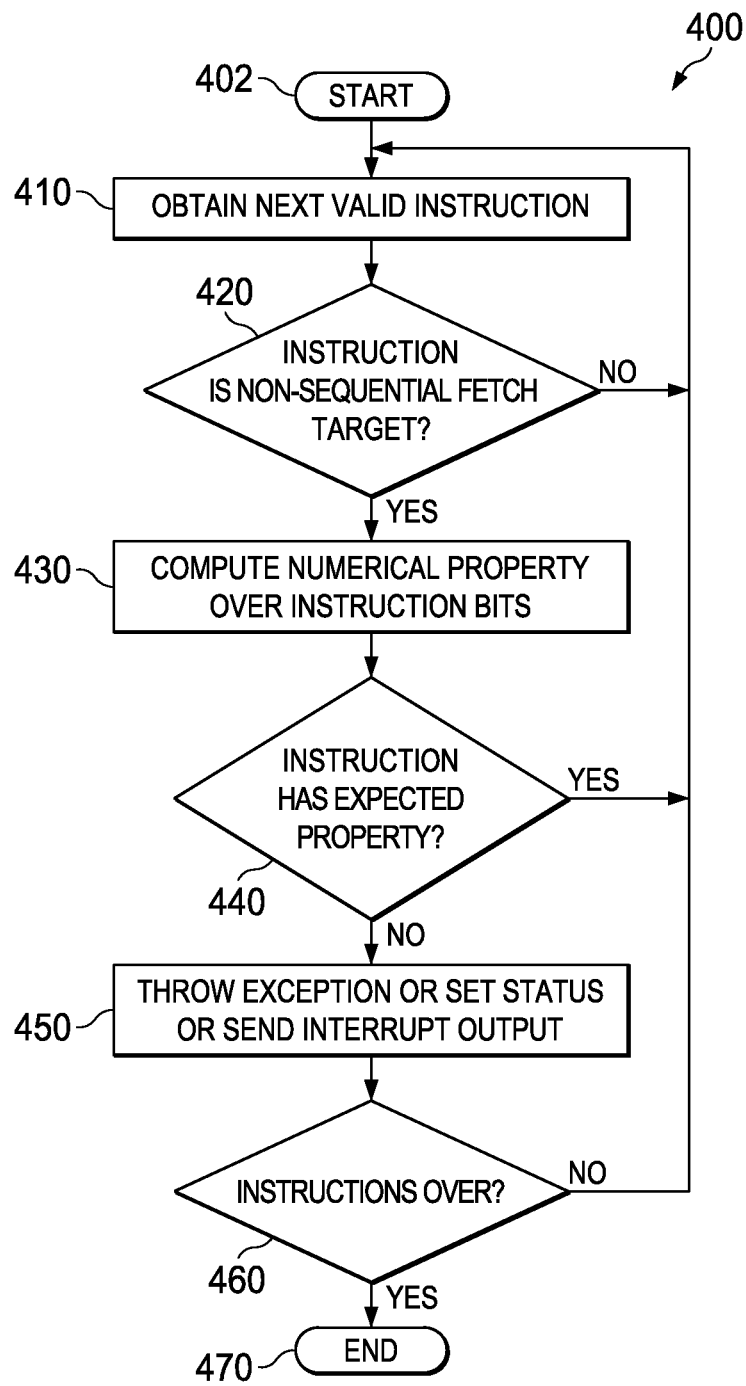
FIG. 4 is a simplified block diagram illustrating example operational activities that may be associated with embodiments of the present disclosure.

Turning to FIG. 4, FIG. 4 is a flowchart illustrating example operational activities that may be associated with embodiments of the present disclosure. A method 400 begins at process block 402, when a fetch cycle in system 10 is activated. At process block 410, an instruction to be executed is obtained. In decision block 420, a determination is made whether the instruction is a target of a non-sequential fetch. If not, (i.e., the instruction is determined to be a target of a sequential fetch), the process reverts to process block 410 to obtain the next sequential instruction.

If it is determined that the instruction is a target of a non-sequential fetch, a numerical property value over the instruction bits is calculated in process block 430. Next, decision block 440 tests the outcome of the calculation. If the instruction has the expected property (e.g., numerical property, such as parity, hamming distance, etc.), the process reverts to process block 410 to obtain the next instruction. If the instruction does not have the expected property, then a suitable action that avoids execution of the instruction is generated in process block 450. The suitable action that is generated may be, for example, throwing an exception, setting status bits, sending an interrupt output to a control processor, or a combination thereof. A determination is made in decision block 460 whether the instructions to be decoded are over. If not, the process reverts to process block 410 to obtain the next instruction. Otherwise, the process ends in termination block 470.

In example implementations, at least some portions of the activities related to instruction sets with run time consistency check outlined herein may be implemented using software. In some embodiments, one or more of these features may be implemented in hardware, provided external to these elements, or consolidated in any appropriate manner to achieve the intended functionality. System 10 may include software that can coordinate to achieve the operations as outlined herein. In still other embodiments, these elements may include any suitable algorithms, hardware, software, components, modules, interfaces, or objects that facilitate the operations thereof.

Furthermore, system 10 described and shown herein may also include suitable interfaces for receiving, transmitting, and/or otherwise communicating data or information in a network environment. Additionally, some of the processors and memory elements associated with the various elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store encoded instructions, software, logic, or code to be executed to carry out the activities described in this Specification. A processor can execute any type of instructions associated with the data to achieve the operations detailed herein in this Specification. In one example, one or more processors associated with system 10 could transform an element or an article (e.g., data) from one state or thing to another state or thing. In another example, the activities outlined herein may be implemented with fixed logic or programmable logic (e.g., software/computer instructions executed by a processor) and the elements identified herein could include some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components in system 10 can include one or more memory elements for storing information to be used in achieving operations associated with instruction set run-time consistency check as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more elements. However, this has been done for purposes of clarity and example only. It should be appreciated that the system can be consolidated in any suitable manner. In certain cases, it may be easier to describe one or more of the functionalities of a given set of flows by only referencing a limited number of elements. It should be appreciated that system 10 of the FIGURES and its teachings are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to instructions involving certain length (e.g., 32 bits) and instruction formats, system 10 may be applicable to other architectures with different instruction lengths and different formats. Moreover, although system 10 has been illustrated with reference to particular elements and operations that facilitate the instruction execution process, these elements and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining whether an instruction is a target of a non-sequential fetch operation;
   determining an expected numerical property value based on whether the instruction is the target of the non-sequential fetch operation;
   determining, using all bits in the instruction, whether a numerical property value of the instruction matches the expected numerical property value, wherein one bit encoded in a signed offset field of the instruction is a parity bit and is utilized, in part, to modulate the numerical property value; and
   avoiding an execution of the instruction when it is determined that the numerical property value of the instruction does not match the expected numerical property value.

2. The method of claim 1, wherein a subset of the instruction is a field within the instruction specifying a type of operation performed by executing the instruction.

3. The method of claim 1, wherein the one bit is set to 1 to produce a first numerical property value, and wherein the one bit is set to 0 to produce a second numerical property value.

4. The method of claim 1, wherein the expected numerical property value is an even parity of 1 for instructions that are targets of non-sequential fetch operations, and the expected numerical property value is an even parity of 0 for instructions that are not targets of non-sequential fetch operations.

5. The method of claim 1, further comprising:
   performing an action, wherein the action is a selected one of a group of actions, the group consisting of:
   a) throwing an exception;
   b) setting status bits; and
   c) sending an interrupt to a control processor.

6. The method of claim 1, wherein the determining the expected numerical property value based on whether the instruction is the target of the non-sequential fetch operation comprises:
   determining a first expected numerical property value for all instructions that are a target of a non-sequential fetch operation; and
   determining a second expected numerical property value for all instructions that are not a target of a non-sequential fetch operation, wherein the second expected numerical property value is an opposite of the first expected numerical property value.

7. The method of claim 1, further comprising:
   when it is determined that the instruction is the target of the non-sequential fetch operation:
      determining that the instruction is a valid target of the non-sequential fetch operation when the numerical property value of the instruction matches a first expected numerical property value, and
      determining that the instruction is an invalid target of the non-sequential fetch operation when the numerical property value of the instruction does not matches the first expected numerical property value;
   when it is determined that the instruction is not the target of the non-sequential fetch operation:
      determining that the instruction is a valid target of the non-sequential fetch operation when the numerical property value of the instruction matches a second expected numerical property value, and
      determining that the instruction is an invalid target of the non-sequential fetch operation when the numerical property value of the instruction does not matches the second expected numerical property value.

8. An apparatus, comprising:
   a bitwise exclusive OR (XOR) network;
   an indicator of a non-sequential fetch operation; and
   an error detection module, wherein the error detection module is configured to perform operations comprising:
      determining whether an instruction is a target of a non-sequential fetch operation;
      determining an expected numerical property value based on whether the instruction is the target of the non-sequential fetch operation;
      determining, using all bits in the instruction, whether a numerical property value of the instruction matches the expected numerical property value, wherein one bit encoded in a signed offset field of the instruction is a parity bit and is utilized, in part, to modulate the numerical property value; and
      avoiding an execution of the instruction when it is determined that the numerical property value of the instruction does not match the expected numerical property value.

9. The apparatus of claim 8, wherein a subset of the instruction is a field within the instruction specifying a type of operation performed by executing the instruction.

10. The apparatus of claim 8, wherein the one bit is set to 1 to produce a first numerical property value, and wherein the one bit is set to 0 to produce a second numerical property value.

11. The apparatus of claim 8, further comprising:
   a program counter configured to store an address of a next instruction to fetch;
   a fetch logic configured to fetch an instruction from the instruction memory system corresponding to the address in the program counter;
   a decode logic configured to decode the instruction;
   an issue logic configured to choose execution of the instruction;
   a read logic configured to read one or more operands based on the instruction; and
   an integer logic configured to provide control signals that direct the program counter to a non-sequential next address and set the indicator when a change in program flow is encountered.

12. The apparatus of claim 8, wherein the indicator is set when the instruction is a target of a non-sequential operation and the indicator is cleared when the instruction is not a target of a non-sequential operation.

13. The apparatus of claim 8, wherein the error detection module comprises an inverter and an AND gate, and wherein:
   an output of the bitwise XOR network comprises an input to the inverter; and
   an output of the inverter and an output of the indicator comprise inputs to the AND gate.

14. The apparatus of claim 8, wherein the determining the expected numerical property value based on whether the instruction is the target of the non-sequential fetch operation comprises:

determining a first expected numerical property value for all instructions that are a target of a non-sequential fetch operation; and determining a second expected numerical property value for all instructions that are not a target of a non-sequential fetch operation, wherein the second expected numerical property value is an opposite of the first expected numerical property value.

15. The apparatus of claim 8, wherein the operations further comprise:

when it is determined that the instruction is the target of the non-sequential fetch operation:

determining that the instruction is a valid target of the non-sequential fetch operation when the numerical property value of the instruction matches a first expected numerical property value, and determining that the instruction is an invalid target of the non-sequential fetch operation when the numerical property value of the instruction does not matches the first expected numerical property value; and when it is determined that the instruction is not the target of the non-sequential fetch operation:

determining that the instruction is a valid target of the non-sequential fetch operation when the numerical property value of the instruction matches a second expected numerical property value, and determining that the instruction is an invalid target of the non-sequential fetch operation when the numerical property value of the instruction does not matches the second expected numerical property value.

16. Logic encoded in non-transitory media that includes code, which when executed by a processor performs operations comprising:

determining whether an instruction is a target of a non-sequential fetch operation;

determining an expected numerical property value based on whether the instruction is the target of the non-sequential fetch operation;

determining, using all bits in the instruction, whether a numerical property value of the instruction matches the expected numerical property value, wherein one bit encoded in a signed offset field of the instruction is a parity bit and is utilized, in part, to modulate the numerical property value; and avoiding an execution of the instruction when it is determined that the numerical property value of the instruction does not match the expected numerical property value.

17. The logic of claim 16, wherein the determining the expected numerical property value based on whether the instruction is the target of the non-sequential fetch operation comprises:

determining a first expected numerical property value for all instructions that are a target of a non-sequential fetch operation; and determining a second expected numerical property value for all instructions that are not a target of a non-sequential fetch operation, wherein the second expected numerical property value is an opposite of the first expected numerical property value.

18. The logic of claim 16, wherein the operations further comprise:

when it is determined that the instruction is the target of the non-sequential fetch operation:

determining that the instruction is a valid target of the non-sequential fetch operation when the numerical property value of the instruction matches a first expected numerical property value, and determining that the instruction is an invalid target of the non-sequential fetch operation when the numerical property value of the instruction does not matches the first expected numerical property value; and when it is determined that the instruction is not the target of the non-sequential fetch operation:

determining that the instruction is a valid target of the non-sequential fetch operation when the numerical property value of the instruction matches a second expected numerical property value, and determining that the instruction is an invalid target of the non-sequential fetch operation when the numerical property value of the instruction does not matches the second expected numerical property value.

* * * * *